(12) United States Patent
Scoda

(10) Patent No.: US 10,120,847 B2
(45) Date of Patent: Nov. 6, 2018

(54) METHODS FOR TRANSFORMING REQUESTS FOR WEB CONTENT AND DEVICES THEREOF

(75) Inventor: Enrico Scoda, Martignacco (IT)

(73) Assignee: USABLENET INC., New York, NY (US)

( * ) Notice: Subject to any disclaimer, the term of this patent is extended or adjusted under 35 U.S.C. 154(b) by 314 days.

(21) Appl. No.: 13/360,357

(22) Filed: Jan. 27, 2012

(65) Prior Publication Data

US 2013/0198613 A1   Aug. 1, 2013

(51) Int. Cl.
*G06F 17/22* (2006.01)
*G06F 17/30* (2006.01)

(52) U.S. Cl.
CPC ...... *G06F 17/227* (2013.01); *G06F 17/30896* (2013.01)

(58) Field of Classification Search
USPC .......................................................... 715/239
See application file for complete search history.

(56) References Cited

U.S. PATENT DOCUMENTS

| | | | | |
|---|---|---|---|---|
| 6,430,624 | B1 * | 8/2002 | Jamtgaard | G06F 17/30899 707/E17.119 |
| 7,072,984 | B1 * | 7/2006 | Polonsky et al. | 709/246 |
| 7,383,498 | B1 * | 6/2008 | Hickl et al. | 715/235 |
| 7,409,710 | B1 * | 8/2008 | Uchil et al. | 726/19 |
| 7,451,392 | B1 * | 11/2008 | Chalecki | G06F 17/2247 707/E17.061 |
| 7,451,393 | B1 * | 11/2008 | Herbison et al. | 715/234 |
| 2001/0056460 | A1 * | 12/2001 | Sahota | H04N 21/4622 709/201 |
| 2002/0116534 | A1 * | 8/2002 | Teeple | 709/246 |
| 2002/0143821 | A1 * | 10/2002 | Jakubowski | G06F 17/30905 715/236 |
| 2002/0161802 | A1 * | 10/2002 | Gabrick et al. | 707/517 |

(Continued)

OTHER PUBLICATIONS

International Search Report and Written Opinion for International Patent Application No. PCT/US13/20726 (dated May 14, 2013).

(Continued)

*Primary Examiner* — Frank D Mills
(74) *Attorney, Agent, or Firm* — LeClairRyan PLLC

(57) ABSTRACT

A method, computer readable medium and apparatus for transforming a request for web content includes obtaining at a web content optimization computing apparatus a hypertext transfer protocol (HTTP) request for a web page from at least one client computing device. An eXtensible Markup Language (XML) document including a representation of the HTTP request is generated with the web content optimization computing apparatus. At least one rule document associated with the HTTP request is identified with the web content optimization computing apparatus. The identified at least one rule document is transformed with the web content optimization computing apparatus into an eXtensible Stylesheet Language (XSL) document including one or more templates. One or more of the templates of the XSL document are applied with the web content optimization computing apparatus to transform the XML document. The transformed XML document is provided by the web content optimization computing apparatus.

18 Claims, 7 Drawing Sheets

(56) References Cited

U.S. PATENT DOCUMENTS

| | | |
|---|---|---|
| 2003/0028577 A1 | 2/2003 | Dorland et al. |
| 2003/0037076 A1* | 2/2003 | Bravery et al. ............... 707/517 |
| 2003/0106025 A1 | 5/2003 | Cho et al. |
| 2003/0122870 A1* | 7/2003 | Aggarwal ......... G06F 17/30887 715/760 |
| 2004/0015891 A1 | 1/2004 | Arellano-Payne et al. |
| 2004/0064469 A1* | 4/2004 | Takahashi ............... H04L 29/06 |
| 2004/0187080 A1* | 9/2004 | Brooke et al. ................ 715/522 |
| 2005/0014494 A1* | 1/2005 | Owen et al. ................... 455/419 |
| 2005/0021548 A1 | 1/2005 | Bohannon et al. |
| 2005/0050000 A1* | 3/2005 | Kwok et al. ...................... 707/1 |
| 2005/0086584 A1 | 4/2005 | Sampathkumar et al. |
| 2005/0150953 A1 | 7/2005 | Alleshouse |
| 2005/0204281 A1* | 9/2005 | Choate .......................... 715/513 |
| 2005/0240876 A1* | 10/2005 | Myers et al. ................. 715/763 |
| 2006/0277248 A1* | 12/2006 | Baxter et al. ................. 709/201 |
| 2007/0157078 A1* | 7/2007 | Anderson ..................... 715/513 |
| 2008/0250310 A1* | 10/2008 | Chen et al. ................... 715/234 |
| 2009/0132718 A1* | 5/2009 | Groll et al. ................... 709/229 |
| 2010/0057836 A1* | 3/2010 | Anbuselvan .............. G06F 8/70 709/203 |
| 2011/0161803 A1* | 6/2011 | Yao et al. ...................... 715/235 |
| 2011/0307522 A1* | 12/2011 | Futty et al. ................... 707/802 |
| 2012/0096048 A1* | 4/2012 | Patch et al. ................... 707/803 |
| 2012/0150993 A1* | 6/2012 | Flack et al. ................... 709/217 |
| 2012/0173607 A1* | 7/2012 | Connan ............... G06F 17/3089 709/203 |
| 2013/0007598 A1* | 1/2013 | Draper et al. ................. 715/235 |
| 2014/0164905 A1* | 6/2014 | Bruce et al. ................. 715/234 |

OTHER PUBLICATIONS

Barozzi, N., "cocoon-dev mailing list archives", e-mail, Sep. 14, 2000.

Surlyaarachchi, H., "Handling a http-get request and invoking an external Web service with WSO2 ESB", Mar. 16, 2011, WS.

* cited by examiner

```
* About to connect() to processor.com port 80 (#0)          300
*   Trying 63.70.164.32... connected
* Connected to processor.com (63.70.164.32) port 80 (#0)
> GET /app/www.acme.com/sample/?a=1&b=2 HTTP/1.1
> User-Agent: my_browser
> Host: processor.com
> Accept: */*
>
```

FIG. 3

```xml
<?xml version="1.0" encoding="utf-8"?>
<request>
    <url>http://www.acme.com/sample/</url>
    <redirect/>
    <auto_redirect/>
    <encoding/>
    <content-type/>
    <popup/>
    <error/>
    <currentserver>processor.com</currentserver>
    <remoteip>192.168.10.x</remoteip>
    <headers>
        <param name="host">processor.com</param>
        <param name="user-agent">my_browser</param>
        <param name="accept">*/*</param>
    </headers>
    <original-ua>my_browser</original-ua>
    <ua>my_browser</ua>
    <query>
        <param name="a">1</param>
        <param name="b">2</param>
    </query>
    <post></post>
    <cookies></cookies>
    <imode/>
</request>
```

```
<request-rules>
    <rule for="a">
        <execute>
            <set-encoding>Shift_JIS</set-encoding>
            <set-query-param name="b">JP</set-query-param>
        </execute>
    </rule>

<rule for="c">
        <execute>
            <set-query-param name="e">TRANSLATE</set-query-param>
        </execute>
    </rule>

</request-rules>
```

```
<?xml version="1.0" encoding="UTF-8"?>
<xsl:stylesheet xmlns:xsl="http://www.w3.org/1999/XSL/Transform"
                xmlns:request="http://request-rules.org" version="1.0">

<xsl:template match="encoding[request:query-param('a')!=''
                         or request:post-param('a')!='']">
        <xsl:copy>
            Shift_JIS
        </xsl:copy>
    </xsl:template>

<xsl:template match="query[request:query-param('a')!=''
                         or request:post-param('a')!='']">
        <xsl:copy>
            <xsl:copy-of select="param[@name!='b']"/>
            <param name="b">JP</param>
        </xsl:copy>
    </xsl:template>

<xsl:template match="query[request:query-param('c')!=''
                         or request:post-param('c')!='']">
        <xsl:copy>
            <xsl:apply-templates/>
            <param name="e">TRANSLATE</param>
        </xsl:copy>
    </xsl:template>

<xsl:template match="*">
        <xsl:copy>
            <xsl:copy-of select="@*"/>
            <xsl:apply-templates/>
        </xsl:copy>
    </xsl:template>

</xsl:stylesheet>
```

FIG. 6

```
<?xml version="1.0" encoding="utf-8"?>
<request>
    <url>http://www.acme.com/sample/</url>
    <redirect/>
    <auto_redirect/>
    <encoding>Shift_JIS</encoding>
    <content-type/>
    <popup/>
    <error/>
    <currentserver>processor.com</currentserver>
    <remoteip>192.168.10.x</remoteip>
    <headers>
        <param name="host">processor.com</param>
        <param name="user-agent">my_browser</param>
        <param name="accept">*/*</param>
    </headers>
    <original-ua>my_browser</original-ua>
    <ua>my_browser</ua>
    <query>
        <param name="a">1</param>
        <param name="b">JP</param>
    </query>
    <post></post>
    <cookies></cookies>
    <imode/>
</request>
```

METHODS FOR TRANSFORMING REQUESTS FOR WEB CONTENT AND DEVICES THEREOF

FIELD

This technology generally relates to methods and devices for transforming requests for web content and, more particularly, for extending the extensible stylesheet language (XSL) in order to manage hypertext transfer protocol (HTTP) requests for web pages.

BACKGROUND

The introduction of extensible markup language (XML) and the extensible stylesheet language (XSL) specifications has provided an easy way to transform documents between various formats. This functionality has been included in web development frameworks, giving them the ability to automatically transform an XML document into a document with a different format, such as hypertext markup language (HTML) or extensible hypertext markup language (XHTML), integrating the original data with graphic layout and user interface components. The XSL specifications are based on special constructs called templates that match a single element or a set of similar elements and rewrite them and their content based on instructions defined in the template.

Unfortunately, there is currently no effective way to define actions to take, based on attributes of a hypertext transfer protocol (HTTP) request, or otherwise to alter or control the flow of a web application and/or transaction processing the HTTP request. Attributes of the HTTP request can include HTTP header values and/or names of query or post parameters that correspond with web page user interface functionality, such as a submit or purchase button, for example. While XSL has been utilized to transform the format of web content provided in response to an HTTP request resulting from engagement with such user interface functionality, there is no effective method or device that is capable of manipulating an HTTP request based on the engaged functionality, on the type of request, or on any other attribute of the request, in order to communicate with a web application or otherwise affect the flow and/or processing of the request.

SUMMARY

A method for transforming a request for web content includes obtaining at a web content optimization computing apparatus a hypertext transfer protocol (HTTP) request for a web page from at least one client computing device. An extensible markup language (XML) document including a representation of the HTTP request is generated with the web content optimization computing apparatus. At least one rule document associated with the HTTP request is identified with the web content optimization computing apparatus. The identified at least one rule document is transformed with the web content optimization computing apparatus into an extensible stylesheet language (XSL) document including one or more templates. One or more of the templates of the XSL document are applied with the web content optimization computing apparatus to transform the XML document. The transformed XML document is provided by the web content optimization computing apparatus.

A computer readable medium having stored thereon instructions for transforming a request for web content comprising machine executable code which when executed by at least one processor, causes the processor to perform steps including obtaining an HTTP request for a web page from at least one client computing device. An XML document including a representation of the HTTP request is generated. At least one rule document associated with the HTTP request is identified. The identified at least one rule document is transformed into an XSL document including one or more templates. One or more of the templates of the XSL document are applied to transform the XML document. The transformed XML document is provided.

A web content optimization computing apparatus for transforming a request for web content includes one or more processors and a memory coupled to the one or more processors which are configured to execute programmed instructions stored in the memory including obtaining an HTTP request for a web page from at least one client computing device. An XML document including a representation of the HTTP request is generated. At least one rule document associated with the HTTP request is identified. The identified at least one rule document is transformed into an XSL document including one or more templates. One or more of the templates of the XSL document are applied to transform the XML document. The transformed XML document is provided.

This technology provides a number of advantages including providing a method, a computer readable medium, and an apparatus that transforms requests for web content by utilizing XSL to manipulate an HTTP request for the content. More specifically, examples of this technology generate an XML document representing an HTTP request and apply one or more rules to the XML document, the rules being predefined and represented in one or more templates of an XSL document. With this technology, the applied rules can manipulate one or more HTTP request headers or request parameters and/or the actions responsive to the HTTP request and/or flow of the application and/or web transaction configured to process the HTTP request.

BRIEF DESCRIPTION OF THE DRAWINGS

FIG. 3 is an exemplary hypertext transfer protocol (HTTP) request;

FIG. 4 is an exemplary extensible markup language (XML) document including a representation of the HTTP request of FIG. 3;

FIG. 5 is an exemplary rule document;

FIG. 6 is an exemplary extensible stylesheet language (XSL) document including a plurality of exemplary templates and resulting from an exemplary transformation of the rule document of FIG. 5; and FIG. 7 is an exemplary XML document transformed according to an exemplary application of the templates of the XSL document of FIG. 6.

DETAILED DESCRIPTION

Figure 1:
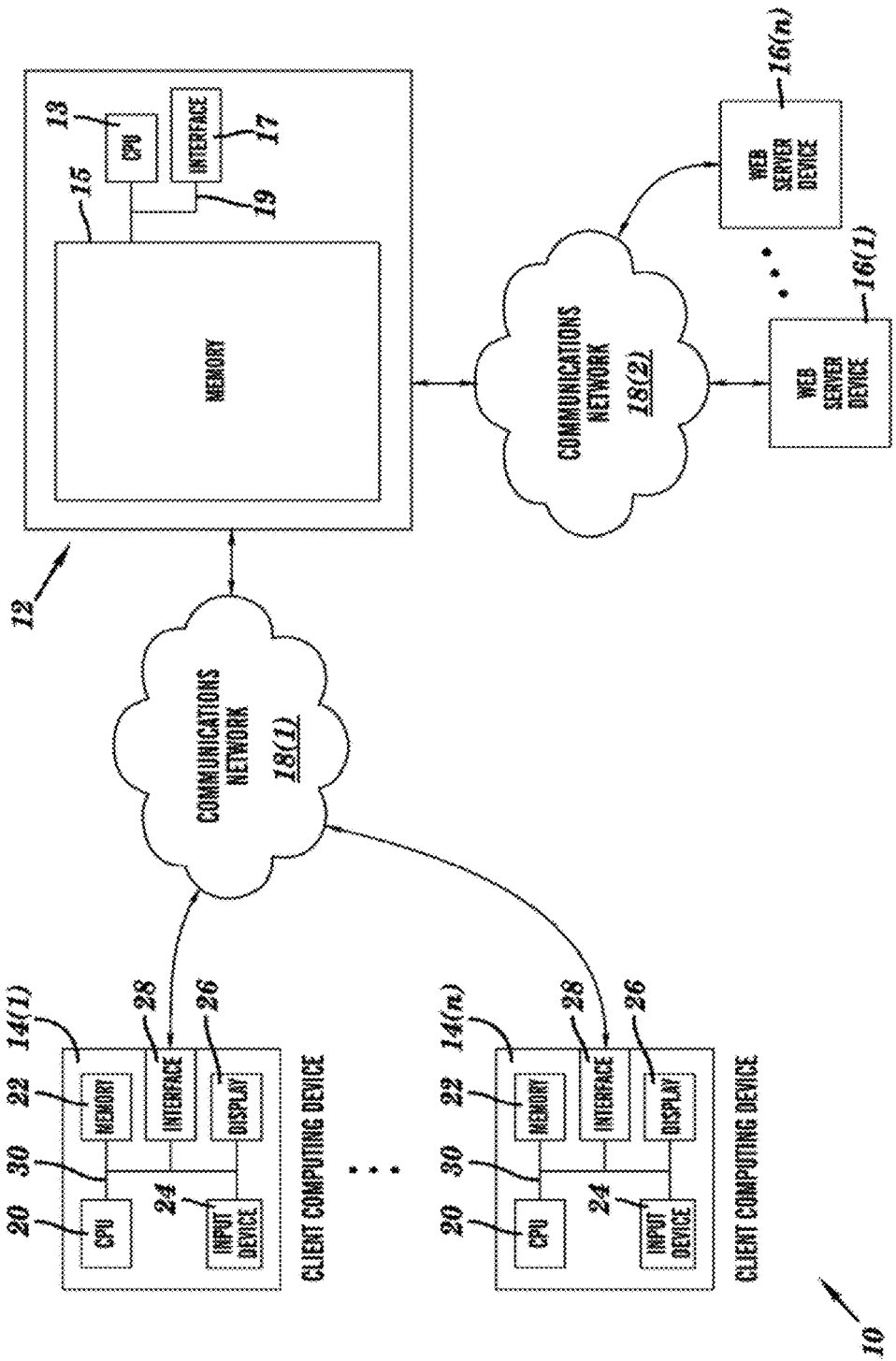
FIG. 1 is a block diagram of an exemplary environment with a web content optimization computing apparatus configured to transform a request for web content.

An exemplary environment 10 with a web content optimization computing apparatus 12 configured to transform requests for web content is illustrated in FIG. 1, although this technology can be implemented on other types of devices, such as one of the web server devices 16(1)-16(n), or any other server computing apparatus configured to receive and process hypertext transfer protocol (HTTP) requests, by way of example only. The exemplary environment 10 includes the web content optimization computing apparatus 12, client devices 14(1)-14(n), the web server devices 16(1)-16(n), and communication networks 18(1)-18(2), although other numbers and types of systems, devices, and/or elements in other configurations and environments with other communication network topologies can be used. This technology provides a number of advantages including providing a method, computer readable medium and an apparatus that transforms HTTP requests for web content, such as a hypertext markup language (HTML) web page, for example, in order to manipulate one or more actions taken based on the HTTP request headers and/or parameters.

Referring more specifically to FIG. 1, the web content optimization computing apparatus 12 includes a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the web content optimization computing apparatus 12 executes a program of stored instructions for one or more aspects of the present invention as described and illustrated by way of the embodiments herein, although the processor could execute other numbers and types of programmed instructions.

The memory 15 in the web content optimization computing apparatus 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the web content optimization computing apparatus 12.

The interface system 17 in the web content optimization computing apparatus 12 is used to operatively couple and communicate between the web content optimization computing apparatus 12 and the client devices 14(1)-14(n) and the web server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the client devices 14(1)-14(n) enables a user to request, receive, and interact with web pages from one or more web sites hosted by the web server devices 16(1)-16(n) through the web content optimization computing apparatus 12 via one or more communication networks 18(1), although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used. In one example, the client devices 14(1)-14(n) comprise smart phones, personal digital assistants, computers, or mobile devices with Internet access that permit a website form page or other retrieved web content to be displayed on the client devices 14(1)-14(n).

Each of the client devices 14(1)-14(n) in this example is a computing device that includes a central processing unit (CPU) or processor 20, a memory 22, user input device 24, a display 26, and an interface system 28, which are coupled together by a bus 30 or other link, although one or more of the client devices 14(1)-14(n) can include other numbers and types of components, parts, devices, systems, and elements in other configurations. The processor 20 in each of the client devices 14(1)-14(n) executes a program of stored instructions for one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n).

The user input device 24 in each of the client devices 14(1)-14(n) is used to input selections, such as requests for a particular website form page or to enter data in fields of a form page, although the user input device could be used to input other types of data and interact with other elements. The user input device can include keypads, touch screens, and/or vocal input processing systems, although other types and numbers of user input devices can be used.

The display 26 in each of the client devices 14(1)-14(n) is used to show data and information to the user, such as website page by way of example only. The display in each of the client devices 14(1)-14(n) can be a mobile phone screen display, although other types and numbers of displays could be used depending on the particular type of client device 14(1)-14(n).

The interface system 28 in each of the client devices 14(1)-14(n) is used to operatively couple and communicate between the client devices 14(1)-14(n), the web content optimization computing apparatus 12, and the web server devices 16(1)-16(n) over the communication networks 18(1) and 18(2), although other types and numbers of communication networks with other types and numbers of connections and configurations can be used.

The web server devices 16(1)-16(n) provide web content such as one or more pages from one or more web sites for use by one or more of the client devices 14(1)-14(n) via the web content optimization computing apparatus 12, although the web server devices 16(1)-16(n) can provide other numbers and types of applications and/or content and can provide other numbers and types of functions. Although the web server devices 16(1)-16(n) are shown for ease of illustration and discussion, other numbers and types of web server systems and devices can be used.

Each of the web server devices 16(1)-16(n) include a central processing unit (CPU) or processor, a memory, and an interface system which are coupled together by a bus or other link, although each of the web server devices 16(1)-16(n) could have other numbers and types of components, parts, devices, systems, and elements in other configurations and locations. The processor in each of the web server devices 16(1)-16(n) executes a program of stored instructions one or more aspects of the present invention as described and illustrated by way of the embodiments herein, although the processor could execute other numbers and types of programmed instructions.

The memory in each of the web server devices 16(1)-16(n) stores these programmed instructions for one or more aspects of the present invention as described and illustrated by way of the embodiments described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server devices 16(1)-16(n).

The interface system in each of the web server devices 16(1)-16(n) is used to operatively couple and communicate between the web server devices 16(1)-16(n), the web content optimization computing apparatus 12, and the client devices 14(1)-14(n) via the communication networks 18(1) and 18(2), although other types and numbers of communication networks with other types and numbers of connections and configurations can be used.

Although embodiments of the web content optimization computing apparatus 12, the client devices 14(1)-14(n), and the web server devices 16(1)-16(n), are described and illustrated herein, each of the client devices 14(1)-14(n), the web content optimization computing apparatus 12, and the web server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
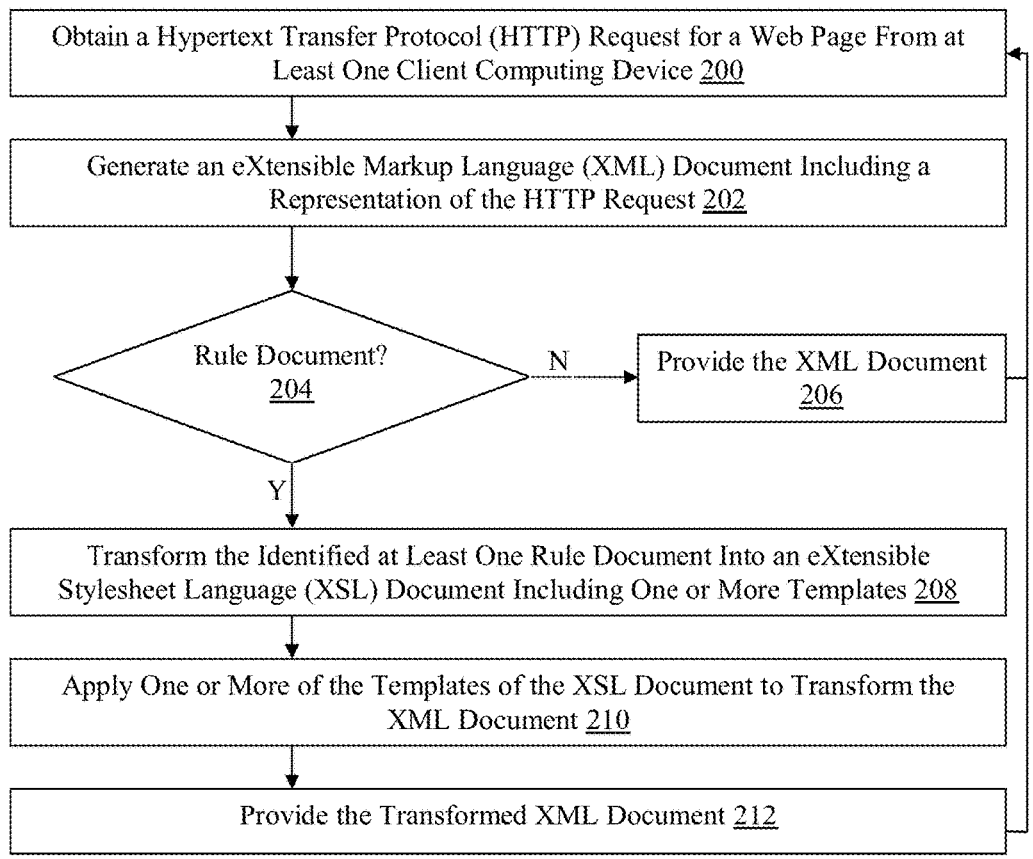
FIG. 2 is a flow chart of an exemplary method transforming a request for web content.

An exemplary method for transforming an HTTP request for web content with the web content optimization computing apparatus 12 will now be described with reference to FIGS. 2-7, although this technology can be executed by other types of devices, such as by one of the web server devices 16(1)-16(n) and without a web content optimization computing apparatus 12 or other proxy server, for example. Referring more specifically to FIG. 2, in step 200 the web content optimization computing apparatus 12 obtains an HTTP request for web content, such as an HTML web page, from at least one of the client devices 14(1)-14(n). The requested web content can be stored on one or more of the web server devices 16(1)-16(n), for example.

Referring to FIG. 3, an exemplary HTTP request 300 for the "http://processor.com/app/www.acme.com/sample/?a=1&b=2" uniform resource located (URL) is shown as communicated by one of the client devices 14(1)-14(n) using a web browser having a "my_browser" associated user agent identification. In this example, the "app" portion of the URL refers to the "app" application operating on the "processor.com" device, which can be the web content optimization computing apparatus 12. The "app" application is configured to download the content referred to by the "www.acme.com/sample/?a=1&b=2" portion of the URL and optionally perform some operation on the content, based on the headers and/or query and/or post parameters of the HTTP request 300, such as transforming the content into a desired format, such as HTML or XHTML and/or a desired graphical format optimal for the browser identified by the user agent, for example. With this technology, as described in detail below, the HTTP request can be manipulated such that the "app" application downloads web content referred to by a different URL than the original URL, performs a different operation on the content than indicated by the headers and/or query and/or post parameter values of the HTTP request 300, and/or performs an action different than, or in addition to, the transformation of the content into a different format, by way of example only.

In order to manipulate the HTTP request 300, an XML document 400 including a representation of the HTTP request is generated, at step 202, by the web content optimization computing apparatus 12. The XML document 400 can include a plurality of elements, optionally nested by a request root element, the values of which are based on the contents of the HTTP request 300. In this example, the value of the URL element is the URL of the content to be downloaded, without any query parameters, the value of the currentserver element is the name of the device running the "app" application, such as the web content optimization computing apparatus 12, that will process the HTTP request 300 to at least retrieve the requested content from one of the web server devices 16, the value of the remoteip element is the IP address of the requesting client device 14(1)-14(n), the value of the headers element is a param element list, the name attribute of each element of which corresponds to each header of the HTTP request 300 such as the host, user-agent, and accept headers and the value of each element of which is included in the HTTP request 300, the value of the original-ua element is the user agent header of the HTTP request 300, and the value of the query element is a param element list, the name attribute of each element of which corresponds to each query parameter of the URL associated with the HTTP request 300 and the value of each element of which is included in the URL associated with the HTTP request 300.

While empty in the exemplary XML document 400 shown in FIG. 4, a plurality of other elements can be provided in the XML document 400, and can contain value(s) based on the HTTP request 300, including a post element having a value of a param element list, the name attribute of each element of which corresponds to each post parameter of the HTTP request 300 and the value of each element of which is set forth in the HTTP request 300, a cookies element having a value of a param element list, the name attribute of each element of which corresponds to a cookie name as included in the HTTP request 300 and the value of each element of which corresponds to a cookie value as included in the HTTP request 300, and an imode element having a string value indicating whether the requesting client device 14(1)-14(n) supports i-mode services.

In other examples, the XML document 400 can contain a plurality of other elements representing actions that can be performed by the "app" application including a redirect element having a value of a URL of a location to which the HTTP request 300 is to be redirected, an auto_redirect element having a value of a string indicating the "app" application should implement an automatic redirect algorithm, such as that described in U.S. patent application Ser. Nos. 12/927,169 and 13/135,707, each of which is hereby incorporated by reference in its entirety, an encoding element having a string value indicating the character set to be used to read the web content requested by the HTTP request 300, a content-type element having a string value indicating the content or mime type to be used to read the web content requested by the HTTP request 300, a popup element having a value to be sent to the requesting client device 14(1)-14(n) to be displayed on the requesting client device 14(1)-14(n) instead of the requested web content, an error element having a string value including an error message to be displayed on the requesting client device 14(1)-14(n) when one or more attributes and/or values of the attributes of the HTTP request 300 are invalid, for example, and a ua element having a string value indicating a user agent to be used by the "app" application, prior to retrieving the requested web content from the web server device 16(1)-16(n), instead of the user agent indicated in the HTTP request 300.

In step 204, the web content optimization computing apparatus 12 determines whether a rule document exists for the HTTP request 300. The web content optimization computing apparatus 12 can identify at least one rule document 500 associated with the HTTP request 300 based on a match of at least a portion of the URL included in the HTTP request 300 or the value of any of the headers included in the HTTP request 300, for example. Accordingly, a plurality of rule documents can be stored in the memory 15 of the web content optimization computing apparatus 12 as associated, such as in a table, with one or more attributes of an HTTP request. In one example, a rule document is provided for a plurality of URLs and the web content optimization computing apparatus 12 is configured to identify the rule document applicable to the current HTTP request based on a match in the table of the URL included in the current HTTP request. In another example, a rule document is stored for one or more user agents and the web content optimization computing apparatus 12 is configured to identify the rule document applicable to the current HTTP request based on a match in the table of the value of the user agent indicated in the HTTP request or in the ua element of the XML document representing the HTTP request, for example. If no rule document is identified at step 204, the web content optimization computing apparatus 12 provides the XML document 400 at step 206, such that the requested web content can be retrieved from the web server device 16(1)-16(n) and communicated to the requesting client device 14(1)-14(n).

If a rule document 500 is identified for the HTTP request at step 204, the web content optimization computing apparatus 12 transforms, at step 208, the identified rule document 500 into an eXtensible Stylesheet Language (XSL) document 600 including one or more templates. An exemplary rule document 500 is shown in FIG. 5 as including two rule elements, each including a "for" condition satisfied based upon a match of a query or post parameter name, for example, and each also including one or more commands nested by an execute element.

In this example, the rule elements of the rule document 500 are established based on a match of a name of the query parameters included in a URL associated with the HTTP request 300, although in other examples one or more rules can be applied based on a match of the name of a post parameter, or based on any other attribute of the HTTP request 300. In one example, the name of one of a query or a post parameter included in a URL associated with the HTTP request 300 corresponds to the name of user interface functionality that, when engaged by a user of one of the client computing devices 14(1)-14(n), results in generating the HTTP request 300 that is then communicated to the web content optimization computing apparatus 12.

In the example shown in FIG. 5, the parameter names included in the conditional expression are "a" and "c" and the commands in the first rule element are set-encoding and set-query-param and the command in the second rule is set-query-param. While the "c" query parameter is not included in the HTTP request 300, the "a" parameter name can indicate the name of user interface functionality such as a button that, when engaged by a user of one of the client computing devices 14(1)-14(n), causes the communication of the HTTP request to be sent to the web content optimization computing apparatus 12. In other examples, the name of the query parameter and associated user interface functionality can be "submit" or "purchase", for example, or any other string value corresponding to a button, image, link, or any other web functionality initiating an HTTP request 300. Accordingly, a rule element, such as the first rule element in the exemplary rule document 500 of FIG. 5, can be included and can correspond to the name of the user interface functionality. The set-encoding command of the first rule element has a string value indicating the character set to be applied to the requested web content by the "app" application. The set-query-param command has a name attribute of a query parameter of the HTTP request 300 to be replaced by the value of the string indicated in the element.

Accordingly, in this example, whenever a user engages the "a" button on a web page, an HTTP request 300 for content is initiated whereby the content is stored on a web server device 16(1)-16(n) located in Japan, for example, and requires Japanese encoding for proper manipulation and/or display. Therefore, a rule element is recited in a rule document 500 conditional upon a match of the "a" query parameter name included in the HTTP request 300 and including a set-encoding command with a "Shift_JIS" value indicating a Japanese character set.

In other examples, commands are set forth in one or more rule elements of the rule document 500 to manipulate one or more parameters of the HTTP request 300, including a remove-post-param command configured to remove a specified post parameter from the HTTP request 300, a remove-query param command configured to remove a specified query parameter from the HTTP request 300, a set-all-post-params command configured to replace all post parameters of the HTTP request 300 with a specified post parameter value, a set-all-query-params command configured to replace all query parameters of the HTTP request 300 with a specified query parameter value, and a set-post-param configured to set a specified post parameter of the HTTP request 300 with a specified value.

In other examples, commands are set forth in one or more rule elements of the rule document 500 to change one or more parameters of the HTTP request 300 and/or one or more parameters of an HTTP response, including a set-content-type command configured to set the content type of the requested web content including in the HTTP request 300 or an HTTP response, a set-cookie command configured to set a new cookie in the HTTP request 300 or an HTTP response, a set-header command configured to add a header to the HTTP request 300 or an HTTP response, and a set-user-agent command configured to change or set the user agent included in the HTTP request 300 or an HTTP response.

In yet other examples, commands are set forth in one or more rule elements of the rule document 500 to change the flow of a web transaction and/or an action performed by the identified "app" application including a set-auto-redirect command configured to enable an automatic redirect algorithm, as identified above, a set-error command configured to set an error message to be displayed on the requesting client device 14(1)-14(n), a set-popup command configured to display a virtual page on the requesting client device 14(1)-14(n) instead of the web content requested by the HTTP request 300, a set-redirect command configured to generate an HTTP response status code 302 to be communicated to the requesting client device 14(1)-14(n), and a set-url command configured to change the URL of the requested web content included in the HTTP request 300.

Accordingly, in this example, the web content optimization computing apparatus 12 identifies the rule document 500, at step 204, of FIG. 5, based on an attribute of the HTTP request 300, as represented by the XML document 400, generated at step 202, and, in order to apply the rule(s) to the HTTP request 300, transforms the rule document 500, at step 208, into an XSL document 600 including one or more templates, an example of which is shown in FIG. 6. The XSL document 600 includes at least one template corresponding to each rule element included in the rule document 500 and, optionally, each command included in each rule element.

In the exemplary rule document 500 of FIG. 5, a first rule element is associated with a query or post parameter value of "a" and a second rule is associated with a query or post parameter value of "c". The first rule includes a first command to set the encoding of the character set of the requested web content to "Shift_JIS", a Japanese encoding, and a second command to set the value of the query parameter having a value of "b" in the initial HTTP request to the value of "JP." The second rule includes a command to set the value of the query parameter having a value of "e" in the HTTP request 300 to the value of "TRANSLATE". While the HTTP request 300 does not include a query parameter having a value of "e", as shown in FIG. 3, in one example all rule elements are included as part of the transformation of the rule document 500 into the XSL document 600, and have a corresponding template in the XSL document 600, irrespective of whether the rule element(s) are applicable to the current HTTP request 300.

In step 210, the web content optimization computing apparatus 12 applies one or more of the templates of the XSL document 600 in order to transform the XML document 400 into the transformed XML document 700, an example of which is shown in FIG. 7. The exemplary XSL document 600, resulting from a transformation of the rule document 500, includes a first template with a match expression for the "a" query parameter and configured to set a value for the encoding element to "Shift_JIS" when applied to the XML document 400, as shown in the resulting transformed XML document 700. The XSL document 600 further includes a second template with a match expression for the "a" query parameter and configured to change the value of the "b" query parameter from "2" to "JP" when applied to the XML document 400, as shown in the resulting transformed XML document 700. The XSL document 600 further includes a third template with a match expression for a "c" query parameter which is not satisfied by the current HTTP request 300. The rule elements included in the rule document 500 are exemplary only and the rule elements can include any number and type of commands as identified above, or any other command. Additionally, the associated templates of the XSL document 600, resulting from a transformation of the rule elements of the rule document 500, can change and/or set values for any element of the HTTP request 300.

In step 212, the web content optimization computing apparatus 12 provides the transformed XML document 700, such as to the "app" application identified by the URL associated with the HTTP request 300 and configured to process and service the HTTP request 300 according to the transformed XML document 700, including by retrieving the requested web content from the web server device 16(1)-16(n) and communicating it to the requesting client computing device 14(1)-14(n).

Accordingly, in this example, the "app" application interprets the HTTP request represented by the transformed XML document 700 to retrieve the requested content as identified by the "http://www.acme.com/sample" value of the url element and encodes the requested content with the Shift_JIS character set as indicated by the value of the encoding element, thereby overriding any other encoding that may have been applied by the "app" application. Accordingly, in this example, the HTTP request 300 is manipulated, based on predefined rules, to ensure the proper display of the requested web content on the client device 14(1)-14(n).

Accordingly, as illustrated and described herein this technology provides a number of advantages including providing a method, a computer readable medium, and an apparatus that transforms requests for web content by utilizing XSL to manipulate an HTTP request for the content. More specifically, examples of this technology identify a rule document based on one or more attributes of an HTTP request, transform the rule document into an XSL document, and apply the XSL document to an XML representation of the HTTP request. With this technology, one or more HTTP request headers, one or more HTTP request parameters and/or parameter values, and/or one or more actions performed in response to an HTTP request can be manipulated based on one or more predefined rules, thereby enabling control over the flow of a web application and/or transaction.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifi- cations are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for transforming requests for web content in order to manipulate server-side processing of the requests, the method implemented by one or more web content optimization computing apparatuses and comprising:
    obtaining, via one or more communication networks, a hypertext transfer protocol (HTTP) request from at least one client computing device;
    generating an eXtensible Markup Language (XML) document comprising a representation of the HTTP request;
    identifying at least one rule document associated with the HTTP request, the rule document comprising one or more rule elements defining one or more manipulations to one or more parameters of the HTTP request;
    transforming the identified at least one rule document into an eXtensible Stylesheet Language (XSL) document including one or more templates;
    applying at least one of the one or more templates of the XSL document to the XML document comprising the representation of the HTTP request to modify one or more values of one or more elements of the XML document while maintaining an XML format of the XML document; and
    providing, via another one or more communication networks, the XML document with the modified element values to a destination identified in a uniform resource locator (URL) associated with the HTTP request and hosted by a server computing device.

2. The method as set forth in claim 1 wherein the providing further comprises providing the XML document to the destination without modifying the XML document, when there is not at least one rule document associated with the HTTP request.

3. The method as set forth in claim 1 wherein the one or more elements comprise the URL, a redirect, an auto_redirect, an encoding, a content-type, a popup, an error, a currentserver, a remoteip, one or more headers, an original-ua, a ua, a query, a post, one or more cookies, or an imode.

4. The method as set forth in claim 1 wherein the at least one rule document comprises at least one rule and each rule comprises at least one command comprising remove-post-param, remove-query-param, set-all-post-params, set-all-query-params, set-auto-redirect, set-content-type, set-cookie, set-encoding, set-error, set-header, set-popup, set-post-param, set-query-param, set-redirect, set-url, or set-user-agent.

5. The method as set forth in claim 1 wherein the rule document includes at least one rule including a conditional expression satisfied based on a match of a name of one of a query parameter or a post parameter included in the URL associated with the HTTP request, wherein the name corresponds to a name of user interface functionality configured to initiate an HTTP request when engaged.

6. The method as set forth in claim 1 wherein the providing further comprises communicating the XML document with the modified element values to an application identified by the URL associated with the HTTP request and configured to service the HTTP request based at least in part on the XML document with the modified element values.

7. A non-transitory computer readable medium having stored thereon instructions for transforming requests for web content in order to manipulate the server-side processing of the requests comprising machine executable code which when executed by at least one processor, causes the processor to:
    obtain, via one or more communication networks, a hypertext transfer protocol (HTTP) request from at least one client computing device;
    generate an eXtensible Markup Language (XML) document comprising a representation of the HTTP request;
    identify at least one rule document associated with the HTTP request, the rule document comprising one or more rule elements defining one or more manipulations to one or more parameters of the HTTP request;
    transform the identified at least one rule document into an eXtensible Stylesheet Language (XSL) document including one or more templates;
    apply at least one of the one or more templates of the XSL document to the XML document comprising the representation of the HTTP request to modify one or more values of one or more elements of the XML document while maintaining an XML format of the XML document; and
    provide, via another one or more communication networks, the XML document with the modified element values to a destination identified in a uniform resource locator (URL) associated with the HTTP request and hosted by a server computing device.

8. The medium as set forth in claim 7 wherein the machine executable code when executed by the processor further causes the processor to provide the XML document to the destination without modifying the XML document, when there is not at least one rule document associated with the HTTP request.

9. The medium as set forth in claim 7 wherein the one or more elements comprise the URL, a redirect, an auto_redirect, an encoding, a content-type, a popup, an error, a currentserver, a remoteip, one or more headers, an original-ua, a ua, a query, a post, one or more cookies, or an imode.

10. The medium as set forth in claim 7 wherein the at least one rule document includes at least one rule and wherein each rule comprises at least one command comprising remove-post-param, remove-query-param, set-all-post-params, set-all-query-params, set-auto-redirect, set-content-type, set-cookie, set-encoding, set-error, set-header, set-popup, set-post-param, set-query-param, set-redirect, set-url, or set-user-agent.

11. The medium as set forth in claim 7 wherein the rule document includes at least one rule including a conditional expression satisfied based on a match of a name of one of a query parameter or a post parameter included in the URL associated with the HTTP request wherein the name corresponds to a name of user interface functionality configured to initiate an HTTP request when engaged.

12. The medium as set forth in claim 7 wherein the machine executable code when executed by the processor further causes the processor to communicate the XML document with the modified element values to an application identified by the URL associated with the HTTP request and configured to service the HTTP request based at least in part on the XML document with the modified element values.

13. A web content optimization computing apparatus for transforming a request for web content, comprising a memory comprising programmed instructions stored in the memory, the memory coupled to one or more processors, which are configured to be capable of executing the programmed instructions stored in the memory to:

obtain, via one or more communication networks, a hypertext transfer protocol (HTTP) request from at least one client computing device;

generate an eXtensible Markup Language (XML) document comprising a representation of the HTTP request;

identify at least one rule document associated with the HTTP request, the rule document comprising one or more rule elements defining one or more manipulations to one or more parameters of the HTTP request;

transform the identified at least one rule document into an eXtensible Stylesheet Language (XSL) document including one or more templates;

apply at least one of the one or more templates of the XSL document to the XML document comprising the representation of the HTTP request to modify one or more values of one or more elements of the XML document while maintaining an XML format of the XML document; and provide, via another one or more communication networks, the XML document with the modified elements to a destination identified in a uniform resource locator (URL) associated with the HTTP request and hosted by a server computing device.

14. The apparatus as set forth in claim 13 wherein the one or more processors are further configured to be capable of executing the programmed instructions stored in the memory to provide the XML document to the destination without modifying the XML document, when there is not at least one rule document associated with the HTTP request.

15. The apparatus as set forth in claim 13 wherein the one or more elements comprise the URL, a redirect, an auto_redirect, an encoding, a content-type, a popup, an error, a currentserver, a remoteip, one or more headers, an original-ua, a ua, a query, a post, one or more cookies, or an imode.

16. The apparatus as set forth in claim 13 wherein the at least one rule document includes at least one rule and wherein each rule comprises at least one command comprising remove-post-param, remove-query-param, set-all-post-params, set-all-query-params, set-auto-redirect, set-content-type, set-cookie, set-encoding, set-error, set-header, set-popup, set-post-param, set-query-param, set-redirect, set-url, or set-user-agent.

17. The apparatus as set forth in claim 13 wherein the rule document includes at least one rule including a conditional expression satisfied based on a match of a name of one of a query parameter or a post parameter included in the URL associated with the HTTP request wherein the name corresponds to a name of user interface functionality configured to initiate an HTTP request when engaged.

18. The apparatus as set forth in claim 13 wherein the one or more processors are further configured to be capable of executing the programmed instructions stored in the memory to communicate the XML document with the modified element values to an application identified by the URL associated with the HTTP request and configured to service the HTTP request based at least in part on the XML document with the modified element values.

* * * * *